US012543955B2

(12) United States Patent
Boctor et al.

(10) Patent No.: US 12,543,955 B2
(45) Date of Patent: Feb. 10, 2026

(54) APPARATUS AND METHOD FOR PATIENT MONITORING BASED ON ULTRASOUND MODULATION

(71) Applicant: The Johns Hopkins University, Baltimore, MD (US)

(72) Inventors: Emad M. Boctor, Ellicott City, MD (US); Maged Harraz, Ellicott City, MD (US); Ernest M. Graham, Clarksville, MD (US); Jeeun Kang, Baltimore, MD (US); Raymond C. Koehler, Catonsville, MD (US); Adarsha Malla, Dublin, GA (US)

(73) Assignee: The Johns Hopkins University, Baltimore, MD (US)

(*) Notice: Subject to any disclaimer, the term of this patent is extended or adjusted under 35 U.S.C. 154(b) by 1265 days.

(21) Appl. No.: 17/309,382

(22) PCT Filed: Nov. 25, 2019

(86) PCT No.: PCT/US2019/063084
§ 371 (c)(1),
(2) Date: May 24, 2021

(87) PCT Pub. No.: WO2020/112682
PCT Pub. Date: Jun. 4, 2020

(65) Prior Publication Data
US 2022/0031224 A1 Feb. 3, 2022

Related U.S. Application Data

(60) Provisional application No. 62/771,410, filed on Nov. 26, 2018.

(51) Int. Cl.
*A61B 5/00* (2006.01)
*A61B 5/0507* (2021.01)
(Continued)

(52) U.S. Cl.
CPC .......... *A61B 5/0095* (2013.01); *A61B 5/0093* (2013.01); *A61B 5/0507* (2013.01);
(Continued)

(58) Field of Classification Search
None
See application file for complete search history.

(56) References Cited

U.S. PATENT DOCUMENTS 7,047,055 B2    5/2006   Boas et al.
9,380,967 B2    7/2016   Esenaliev et al.
(Continued)

FOREIGN PATENT DOCUMENTS

WO    2007072490 A1    6/2007
WO    2016/007678 A1   1/2016
(Continued)

OTHER PUBLICATIONS

International Search Report and Written Opinion for Application No. PCT/US2019/063084, mailed on Feb. 27, 2020, 6 pages.
(Continued)

*Primary Examiner* — Pascal M Bui Pho
*Assistant Examiner* — Michael S Kellogg
(74) *Attorney, Agent, or Firm* — Harrity & Harrity, LLP

(57) ABSTRACT

The present disclosure is associated with monitoring health of a patient. An example electromagnetic-evoked acoustic device includes an electromagnetic component to emit energy toward tissue of a patient to cause the energy to be absorbed by the tissue; an ultrasound transmission component to transmit acoustic energy toward the tissue to cause a biological response from the tissue; and an ultrasound sensing component to sense the biological response from the tissue to permit a status of the tissue to be determined, wherein the biological response is sensed based on the energy absorbed by the tissue during the biological response.

20 Claims, 10 Drawing Sheets

(51) Int. Cl.
*A61B 5/377* (2021.01)
*A61B 8/08* (2006.01)
*A61N 7/00* (2006.01)

(52) U.S. Cl.
CPC ............... *A61B 5/377* (2021.01); *A61N 7/00* (2013.01); *A61B 5/0042* (2013.01); *A61B 5/4064* (2013.01); *A61B 5/4362* (2013.01); *A61B 8/0866* (2013.01); *A61B 2503/02* (2013.01); *A61N 2007/0026* (2013.01)

(56) References Cited

U.S. PATENT DOCUMENTS

| | | | | |
|---|---|---|---|---|
| 2008/0051845 | A1* | 2/2008 | Mentelos | A61B 5/276 607/28 |
| 2008/0071172 | A1* | 3/2008 | Bruck | A61B 5/0059 600/438 |
| 2014/0024928 | A1 | 1/2014 | Boctor et al. | |
| 2015/0151142 | A1* | 6/2015 | Tyler | A61B 6/03 601/2 |
| 2015/0182123 | A1* | 7/2015 | Sato | A61B 5/0059 600/407 |
| 2016/0262674 | A1 | 9/2016 | Esenaliev et al. | |
| 2016/0335514 | A1* | 11/2016 | Arbabian | A61B 5/489 |
| 2017/0311808 | A1 | 11/2017 | Thornton et al. | |
| 2018/0214119 | A1 | 8/2018 | Mehrmohammadi et al. | |

FOREIGN PATENT DOCUMENTS

| | | |
|---|---|---|
| WO | 2018109950 A1 | 6/2018 |
| WO | 2018/209118 A2 | 11/2018 |

OTHER PUBLICATIONS

Kang et al., "Validation of Noninvasive Photoacoustic Measurements of Sagittal Sinus Oxyhemoglobin Saturation in Hypoxic Neonatal Piglets," www.physiology.org/journal/jappl, Sep. 6, 2018, 28 pages.

Extended European Search Report for Application No. EP19888297, mailed on Jun. 10, 2022, 10 pages.

* cited by examiner

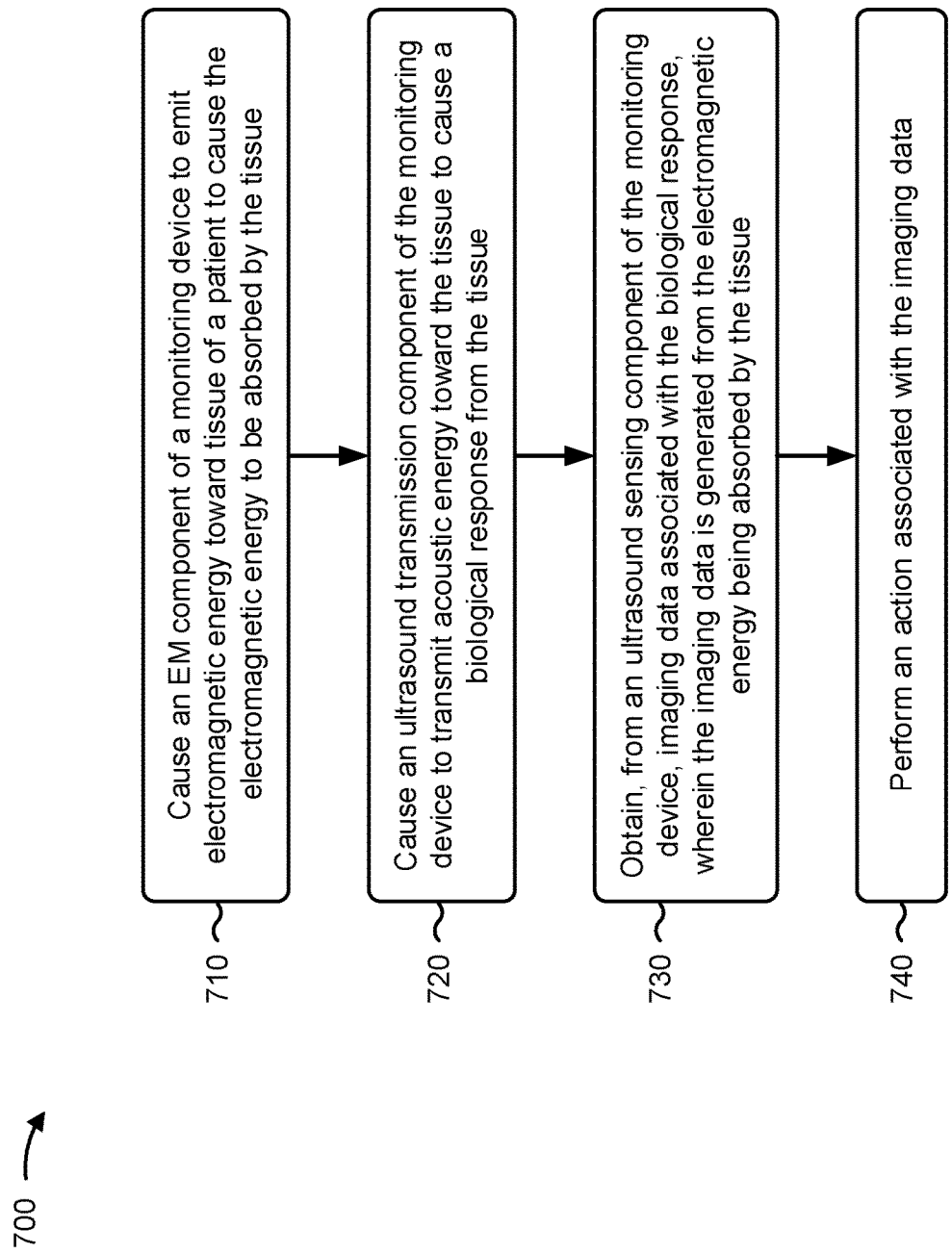

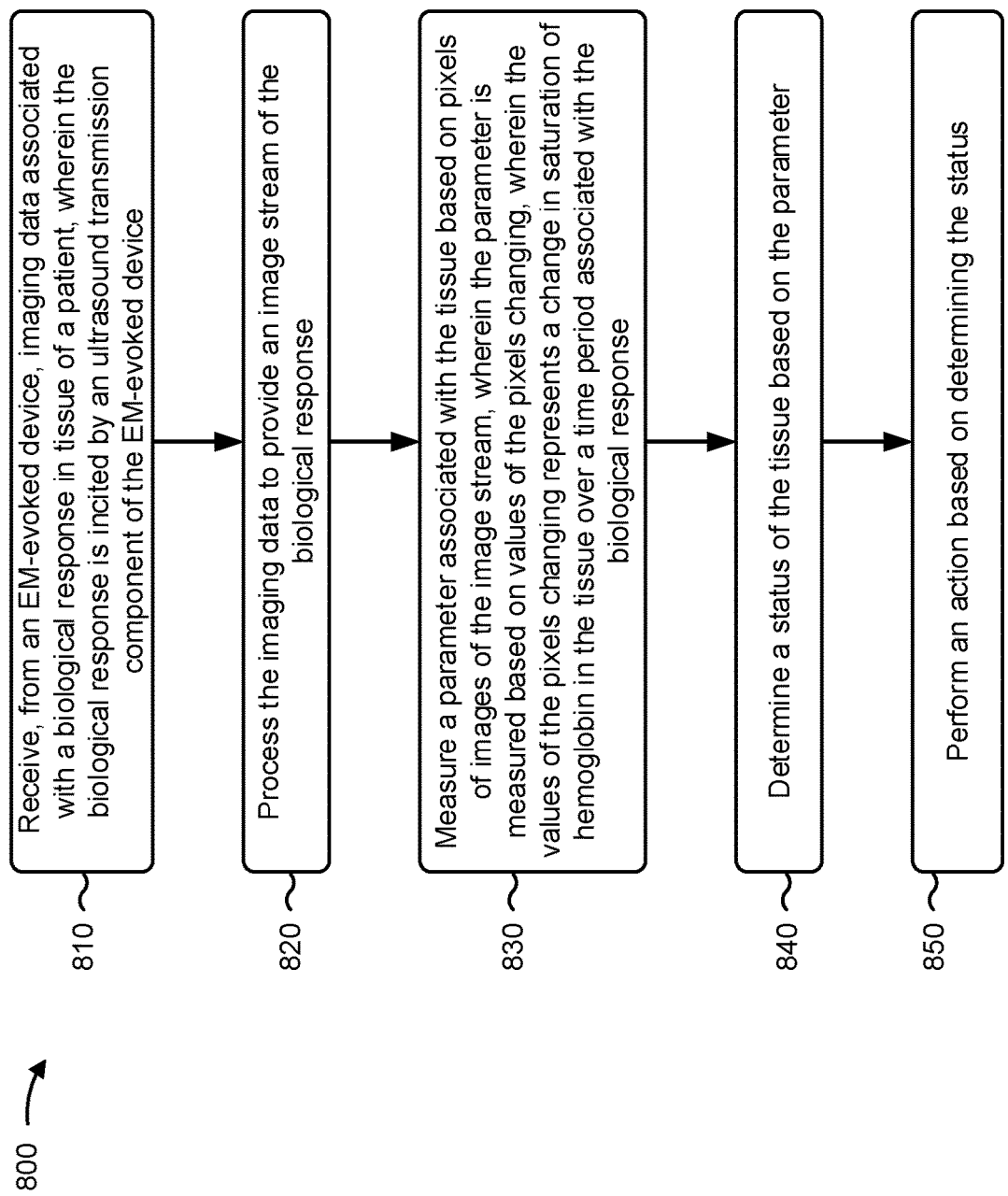

APPARATUS AND METHOD FOR PATIENT MONITORING BASED ON ULTRASOUND MODULATION

RELATED APPLICATION(S)

This application is a 371 national stage of PCT Application PCT/US2019/063084 filed on Nov. 25, 2019, entitled "APPARATUS AND METHOD FOR PATIENT MONITORING BASED ON ULTRASOUND MODULATION," which claims priority to U.S. Provisional Patent Application No. 62/771,410, filed on Nov. 26, 2018, and entitled "APPARATUS AND METHOD FOR PHOTOACOUSTIC MONITORING BASED ON ULTRASOUND NEUROMODULATION," both of which are hereby expressly incorporated by reference herein.

GOVERNMENT LICENSE RIGHTS

This invention was made with U.S. Government support under grant 1R01HL139543-01, awarded by the National Institute of Health (NIH), National Center for Biotechnology Information (NCBI). The U.S. Government has certain rights in the invention.

BACKGROUND

Hypoxic-ischemic encephalopathy (HIE) is a brain injury caused by oxygen deprivation to the brain. Perinatal HIE remains a significant cause of developmental brain injury despite advances in obstetric and neonatal medicine. For example, due to inadequate blood flow through the placenta, blood flow to a fetal brain can be impeded, preventing delivery of oxygen in the blood from reaching the brain. In some cases, blood flow to the uterus or through the umbilical cord may be impeded and result in a decrease in oxygenation to the entire body of the fetus. In other cases, a blood clot can be transported into one of the cerebral arteries of the fetus or newborn and cause a stroke. Accordingly, before labor, during labor and/or after labor, one or more health characteristics of the fetus or newborn may be monitored to attempt to predict and/or detect potential perinatal HIE. Other types of biological conditions, such as internal bleeding, and/or the like, may similarly be monitored or detected to preserve the health of the fetus, newborn, or other type of patient.

SUMMARY

According to some implementations, an electromagnetic-evoked acoustic device includes an electromagnetic component to emit energy toward tissue of a patient to cause the energy to be absorbed by the tissue; an ultrasound transmission component to transmit acoustic energy toward the tissue to cause a biological response from the tissue; and an ultrasound sensing component to sense the biological response from the tissue to permit a status of the tissue to be determined, wherein the biological response is sensed based on the energy absorbed by the tissue during the biological response.

According to some implementations, a system for biological function monitoring may include an electromagnetic-evoked acoustic device that includes an electromagnetic component, an ultrasound transmission component, and an ultrasound sensing component; and a control device, wherein the control device includes one or more processors to: control the electromagnetic component to emit electromagnetic energy toward tissue of a patient; control the ultrasound transmission component to transmit acoustic energy toward the tissue to incite a biological response from the tissue; receive, from the ultrasound sensing component, imaging data associated with the biological response, wherein the imaging data is representative of the electromagnetic energy being absorbed by the tissue during the biological response; and perform an action associated with the biological response.

According to some implementations, a method may include causing an electromagnetic component of a monitoring device to emit electromagnetic energy toward tissue of a patient to cause the electromagnetic energy to be absorbed by the tissue; causing an ultrasound transmission component of the monitoring device to transmit acoustic energy toward the tissue to cause a biological response from the tissue; and obtaining, from an ultrasound sensing component of the monitoring device, imaging data associated with the biological response, wherein the imaging data is generated from the electromagnetic energy being absorbed by the tissue; and performing an action associated with the imaging data.

BRIEF DESCRIPTION OF THE DRAWINGS

FIGS. 7 and 8 are flow charts of example processes associated with electromagnetic-evoked acoustic monitoring.

DETAILED DESCRIPTION

Figure 1:
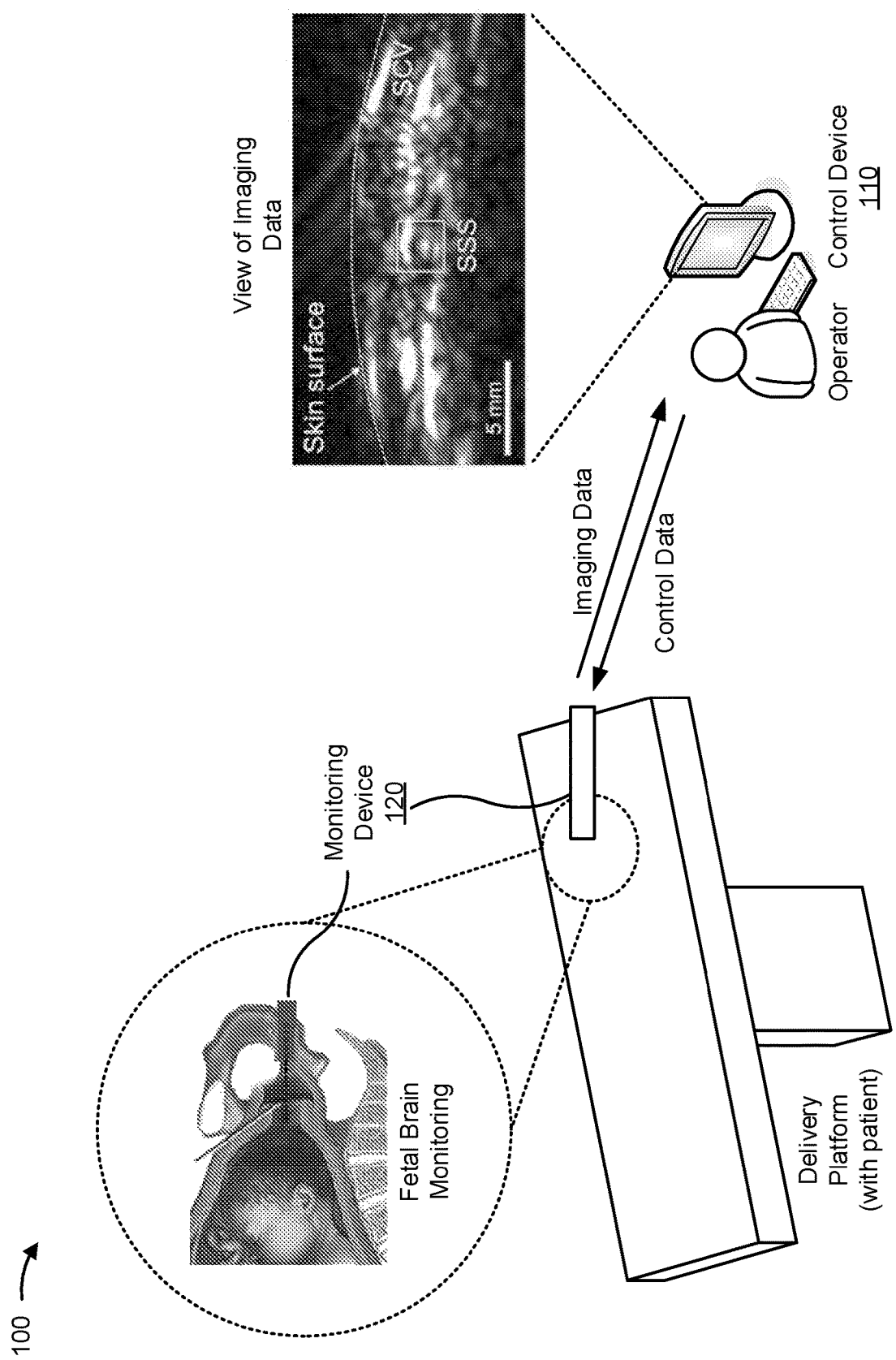
FIG. 1 is a diagram of an example implementation described herein.

The following detailed description of example implementations refers to the accompanying drawings. The same reference numbers in different drawings may identify the same or similar elements.

A child may be monitored before and/or after birth to detect any potential injury to the child (e.g., as a result of the labor) and/or a status (e.g., a health status) of the child. In some cases, a human actor may perform a direct examination of the child and determine a score (e.g., an Apgar score) associated with the health of the child. However, such an examination cannot be performed until after the birth of the child. In some instances, the heart rate of the child is monitored before and/or after birth to detect the flow of oxygen in the child's body. A lack of a sufficient flow of oxygen may be an indicator of developing hypoxic-ischemic encephalopathy (HIE). However, a heart rate of the child may fluctuate, before and/or after birth, for reasons other than HIE, and thus can provide a high false-positive rate for detecting abnormalities and/or predicting childhood neurologic injury. In some instances, magnetic resonance imaging (MRI) of a child can be a diagnostic tool to detect HIE after the birth of the child, but the MRI is generally not performed until 7-10 days after birth. In some instances, biophotonic techniques (e.g., near-infrared (NIR) spectroscopy (NIRS), diffused optical tomography, and/or the like) can be used to noninvasively monitor a cerebral oxygenation level and changes in blood flow within a brain of a child in real-time. However, such biophotonic techniques can only provide spatial resolution at the centimeter scale, which may be ineffective in detecting HIE or stroke before and/or after birth.

Some implementations described herein provide an electromagnetic-evoked (EM-evoked) device that can monitor a child before and after birth via ultrasound modulation of tissue of the child, and corresponding electromagnetic (EM) imaging of a biological response (e.g., a neural response) incited by the ultrasound modulation (e.g., neuromodulation of a neural response). As described herein, the EM-evoked device may include a photoacoustic device, and/or a thermoacoustic device that enables noninvasive monitoring of biological responses (e.g., a brain hemodynamic response, bleeding, and/or the like) to incited acoustic energy, which enables photoacoustic imaging and/or thermoacoustic imaging, respectively, of a severity of injury (e.g., neuronal injury, intra-abdominal injury, and/or the like) of the patient and/or determining a multi-spectral estimation of tissue oxyhemoglobin saturation. As described herein, EM imaging can provide spectral information of biological tissue. For example, photoacoustic imaging can provide relatively rich spectral information in a near-infrared range, while thermoacoustic imaging can employ less-attenuative microwave excitation for relatively deep imaging depth. In some implementations, the EM-evoked device (e.g., by emitting continuous energy, pulsed energy, and/or the like) enables monitoring of tissue (e.g., brain tissue) and one or more parameters over time (across one or more neural responses) that are indicative of HIE. In some implementations, the EM-evoked device may detect and/or determine timing associated with a neural response based on measured electrical activity associated with the neural response. Additionally, or alternatively, the electrical activity associated with the neural response may be used (e.g., in combination with ultrasound sensing and/or imaging) to determine a status of the tissue based on the neural response. Accordingly, the EM-evoked device, as described herein, may allow for an accurate, noninvasive, real-time method for the diagnosis, management, and/or alerting of HIE or stroke in a patient.

In some implementations, the EM-evoked device may include a miniature probe for use during early labor (e.g., when cervical dilation is only a few centimeters) to enable detection of a lack of oxygen to the brain (e.g., hypoxia) during labor, and thereby enable rapid response during labor (e.g., to perform a cesarean section, adjust a position of the fetus in the uterus or birth canal, adjust a position of a mother of the fetus, and/or the like). In some implementations, the device may be aligned with the superior sagittal sinus (SSS) of the fetus or newborn to monitor global oxygenation of the brain. In some implementations, the EM-evoked device may include a relatively larger (e.g., relative to a miniature version of the photoacoustic device, NIRS technology, and/or the like) probe for monitoring a brain of a newborn child (e.g., from immediately after birth) to enable greater spatial imaging resolution of brain hemodynamics of the newborn child.

Furthermore, some implementations described herein enable a determination of a probability that a patient may experience a stroke (e.g., due to a clot resulting in reduced flow of oxygenated blood or a hemorrhage disrupting blood circulation). In some implementations, a helmet-type device may be used to measure a parameter associated with oxyhemoglobin saturation and/or hemoglobin concentration (e.g., total hemoglobin concentration, and/or the like) in the brain of the patient to determine the probability of a stroke. For example, before or after delivery, an EM-evoked helmet-type device may be placed over the head of the patient to measure the brain tissue oxyhemoglobin saturation and/or hemoglobin concentration and determine the probability of a stroke according to the measured parameters.

In this way, an EM-evoked device is provided that enables monitoring and detection of HIE and/or a stroke in a patient. In some implementations, the patient may be a fetus and/or newborn child. Accordingly, the EM-evoked device may enable a potential injury to the fetus and/or newborn child to be prevented and/or may enable further injury to the fetus and/or newborn child to be prevented (e.g., by enabling one or more operations to be performed to address the HIE and/or stroke in the patient).

While some implementations are described herein in connection with monitoring and/or detecting HIE and/or a stroke, such implementations may similarly apply and/or be used in other clinical applications, such as detecting internal bleeding, brain death, or other biological conditions or associated biological responses.

FIG. 1 is a diagram of an example implementation 100 described herein. As shown in FIG. 1, example implementation 100 includes a control device 110 and a monitoring device 120. Although some implementations described herein are described in terms of monitoring a fetus during labor, some implementations described herein may be used for monitoring a patient before labor (i.e., a fetus) and/or monitoring a patient after labor (e.g., a newborn, an infant, a child, or an adult).

As further shown in FIG. 1, control device 110 may include a monitoring control device with a display device that may be operated by an operator (e.g., an obstetrician, a midwife, a nurse, and/or the like). As described herein, monitoring device 120 may include an EM-evoked device that has an EM component, an ultrasound sensing component, and an ultrasound transmission component. In some implementations, monitoring device 120 may include an electroencephalography (EEG) component.

In some implementations, control device 110 may provide control data to monitoring device 120. For example, control device 110 may cause monitoring device 120 to perform one or more operations to obtain imaging data of tissue of a patient (shown as a fetus) on a delivery platform, to incite a neural response from tissue of the patient, to measure a parameter associated with the neural response, and/or the like.

In some implementations, control device 110 may cause the EM component of monitoring device 120 to emit EM energy toward tissue (e.g., brain tissue, abdominal tissue, and/or the like) of the patient to cause the EM energy to be absorbed by the tissue. As described herein, when emitting energy (e.g., EM energy, such as light energy, thermal energy, and/or the like), the electromagnetic component may emit the energy in a continuous manner (e.g., in an always-on mode or always-active mode with a minimum threshold magnitude during a designated time period), in a pulsed manner (e.g., alternating from an on-mode to an off-mode according to a particular frequency, time period, schedule, and/or the like), according to one or more modulation techniques (e.g., analog modulation, digital modulation, and/or the like), and/or the like.

The EM component may include an optical component to continuously emit light or emit light pulses (e.g., laser pulses, near infrared (NIR) light pulses, and/or the like)

and/or a thermal component to emit thermal energy (e.g., as continuous (or ongoing) microwaves or pulses of microwaves) toward the tissue. In some implementations, control device 110 may cause the ultrasound sensing component of monitoring device 120 to sense acoustic signals generated from absorbers (e.g., molecules, cells, and/or the like that absorb light) in the tissue of the patient that absorbed the energy emitted by the EM component of monitoring device 120. As mentioned above, absorption of the energy causes acoustic signals to be formed as a result of thermoelastic expansion of the tissue. Accordingly, control device 110 may cause the ultrasound sensing component of monitoring device 120 to generate imaging data (e.g., for EM imaging) corresponding to sensing the energy being absorbed by the tissue. The imaging data may be used to generate an image of the tissue based on the sensed energy absorption. In some implementations, the imaging data may correspond to an image stream (e.g., a series of images that can be used to produce a video of the tissue). In some implementations, control device 110 may configure one or more of a frequency associated with a frame rate of the image stream (e.g., a temporal resolution corresponding to how often an image is to be captured), a spatial resolution of images in the image stream (e.g., a high contrast resolution to permit sensing of target molecules in the tissue), and/or the like.

In some implementations, control device 110 may cause an ultrasound transmission component of monitoring device 120 to transmit acoustic energy toward the tissue to cause a biological response from the tissue. The biological response may include a neural response corresponding to neuronal activity involving the firing or non-firing of one or more neurons based on a stimulant. The biological response may correspond to bleeding or other types of biological activity performed by the tissue as a result of the acoustic energy. As described herein, the ultrasound transmission component of monitoring device 120 may interrogate the tissue (e.g., by inciting a neural response in the tissue and capturing an image of the neural response) of the patient to enable the neural response to be analyzed to enable detection of the health status of the tissue. Control device 110 may control the ultrasound transmission component of monitoring device 120 using a control signal, such as a voltage application, an excitation of a laser energy, an excitation of a thermal energy, and/or the like.

Additionally, or alternatively, control device 110 may cause the EEG component to sense electrical activity associated with the tissue. For example, control device 110 may use electrical activity data corresponding to the sensed electrical activity to determine timing associated with the biological response (e.g., based on changes in voltage, current, and/or the like detected in the tissue), determine a status of the tissue, and/or the like. In some implementations, the changes to the electrical activity may be mapped to corresponding moments of a biological response (e.g., a beginning, an intermediate stage, an end, and/or the like). Such timing measurements may be made relative to the transmission of the acoustic energy from the ultrasound transmission component (e.g., to detect whether there was an unexpected delay, to determine a duration of the neural response, and/or the like).

In some implementations, control device 110 may cause the ultrasound sensing component to sense a neural response based on the timing of the neural response determined from the electrical activity data. For example, when control device 110 determines, from the electrical activity data, that the neural response is beginning and/or is about to begin, the control device 110 may cause the ultrasound sensing component of the monitoring device to sense the neural response, as described herein, and/or generate imaging data associated with the neural response. Additionally, or alternatively, when control device 110 determines, from the electrical activity, that the neural response is ending or has ended, control device 110 may cause the ultrasound sensing component to cease sensing the neural response and/or generating imaging data associated with the neural response. Accordingly, control device 110 may determine, from the electrical activity, when a biological response begins, changes, and/or ends (e.g., to conserve power resources and/or computing resources that might otherwise be wasted attempting to sense, image, and/or analyze a biological response that has not begun or that has ended). In this way, when combined with the imaging data from the ultrasound sensing component, control device 110 may determine a status of the tissue.

As described herein, control device 110 may detect variations in response perturbations in energy demand from transmissions of the ultrasound transmission component and provide information on the health status of the tissue. For example, control device 110 may measure, from images associated with a neural response, any change in oxyhemoglobin concentration, hemoglobin saturation, cytochrome aa3 oxidized state, and/or lipid contents in the tissue. Additionally, or alternatively, the control device may determine timing and/or a status of the tissue based on electrical activity detected by the EEG component. In this way, control device 110 may quantitate one or more parameters associated with the tissue in order to assess the condition of a brain tissue. Correspondingly, the ultrasound transmission component of monitoring device 120 may enable control device 110 to determine the oxygenation and/or hemoglobin concentration of a fetal brain during labor and/or the brain of a child after birth. Accordingly, including the ultrasound transmission component in monitoring device 120 enables monitoring device 120 to incite a neural response based on oxygen demand and/or vascular responses to neuronal activation in the tissue and capture dynamic changes in the brain as a biomarker of the health status of the tissue.

As further shown in example implementation 100 of FIG. 1, monitoring device 120 may enable fetal brain monitoring. For example, monitoring device 120 may be inserted into a birth canal and received within a uterus (e.g., when the cervix is dilated to at least the width of monitoring device 120). Monitoring device 120 may then provide imaging data associated with the fetal brain to control device 110, which may cause an image associated with the imaging data to be displayed via a user interface (e.g., a monitor, a touchscreen, and/or the like) communicatively coupled to control device 110. In this way, based on providing such a visualization, control device 110 reduces a likelihood of complications during and/or after the birth of a child relative to other techniques that do not provide such accurate imaging of oxyhemoglobin saturation and/or corresponding neural responses, as described herein.

In some implementations, control device 110 may process the imaging data to provide contextual information associated with the tissue. For example, control device 110 may perform a pixel-by-pixel, ratio-metric measurement between multi-wavelength photoacoustic or thermoacoustic signals sensed in a field-of-view of monitoring device 120. Control device 110 may measure values of the pixels (e.g., corresponding to an intensity of the pixels) from imaging data to determine a measurement of a parameter associated with a neural response. The measurement may correspond to changes in the values of the pixels over a time period associated with the neural response, which represents a change in one or more parameters (e.g., an oxyhemoglobin saturation, a hemoglobin concentration, a cytochrome aa3 oxidized state, a lipid content, and/or the like) of the tissue. In some implementations, the wavelength may be set for multi-spectral photoacoustic or thermoacoustic sensing, according to which target molecules (e.g., hemoglobin, cytochrome aa3, lipid, and/or the like) are to be measured (sensed) in the tissue. Furthermore, the temporal resolution of the imaging may be configured according to desired measurements of the molecules.

In some implementations, control device 110 may detect a hypoxic condition in the tissue when an EM-evoked oxygen saturation of hemoglobin in an SSS of a fetus and/or child is less than a particular level (e.g., less than 30%). In some implementations, control device 110 may perform a least-mean-square error estimation for a measurement of a particular parameter (e.g., hemoglobin, cytochrome aa3, lipid, and/or the like) of the tissue and/or neural response of the tissue. For example, light absorption can be measured using spectrophotometric measurement of ex vivo tissue samples (e.g., other tissue samples that have been previously analyzed and/or measured using the same technique). Accordingly, an EM-evoked oxygen saturation can be estimated at the SSS using a least-mean-square error estimation between obtained multispectral photoacoustic data associated with photoacoustic imaging of the SSS and known spectrophotometric absorbance of hemoglobin. Accordingly, control device 110 may determine a quantitative indication of a value of a parameter (e.g., oxygen saturation) of the tissue (e.g., in a particular region of the tissue). In some implementations, control device 110 may measure a change in oxyhemoglobin concentration and/or hemoglobin concentration in tissue (e.g., cortical brain tissue) from acoustic estimations of the oxygen saturation and/or hemoglobin concentration over a time period associated with a neural response. Additionally, or alternatively, control device 110 may detect a stroke associated with a brain of fetus and/or child based on acoustic estimations of changes in oxygen saturation and/or hemoglobin concentration, as described herein. In some implementations, thermoacoustic imaging can be used to sense and/or detect deep neuronal activity of the brain and/or biological activity in fat tissue and/or muscle tissue, sense or detect water contents, sense or detect internal bleeding, and/or the like. Other biological tissue providing absorptive contrast may be visualized for differential diagnoses of diseases.

In some implementations, control device 110 may use one or more artificial intelligence techniques (e.g., machine learning, deep learning, and/or the like) associated with processing imaging data (e.g., via pattern recognition, neural networks, heuristics, and/or the like) from monitoring device 120. Accordingly, the one or more artificial intelligence techniques may enable control device 110 to automatically identify, from the imaging data and/or electrical activity data received, a change in saturation of oxyhemoglobin and/or hemoglobin concentration associated with an incited biological response in a particular region of the tissue (e.g., indicative of a stroke in a particular region of the brain), and provide corresponding information to an operator. For example, control device 110, via a user interface, may alert the operator (e.g., through an audible alarm, a visual alarm, a vibrating alarm, and/or the like) when a measured value of a parameter indicates that the patient is likely experiencing a stroke and/or is about to experience a stroke (e.g., when the value satisfies a threshold representative of a stroke being imminent and/or occurring). Based on the alert provided via the user interface, the operator may perform one or more operations to attempt to prevent injury or further injury to the patient.

Accordingly, control device 110 may use a machine learning model to identify a status of the tissue that is being monitored and/or a change to the status of the tissue over a time period associated with the biological response. For example, control device 110 may train the machine learning model based on measuring, from imaging data, one or more parameters associated with identifying the status of the tissue and/or a change in the status of the tissue, such as an oxygen saturation level, a hemoglobin concentration level, a cytochrome aa3 oxidized state (e.g., a level of the cytochrome aa3 oxidized state), an amount of lipids in the tissue, an amount of changes to one or more parameters within a particular time period (e.g., corresponding to a neural response), a type of the tissue, an operation associated with the tissue (e.g., delivering a patient associated with the tissue), a spatial resolution associated with one or more images associated with the imaging data, a temporal resolution associated with one or more images associated with the imaging data, electrical activity associated with the tissue, timing associated with the electrical activity associated with the tissue (which may correspond to timing of the neural response), and/or the like. Control device 110 may train the machine learning model using historical data associated with identifying the status according to the one or more parameters. For example, the historical data may be associated with measuring the one or more parameters from other imaging data associated with one or more other biological responses incited in tissues of one or more other patients. Using the historical data and the one or more parameters as inputs to the machine learning model, control device 110 may identify the status, to permit an operation associated with the patient to correspondingly be performed. Additionally, or alternatively, the machine learning model may consider one or more other metrics of the patient that are being monitored, such as auditory-evoked potential (AEP), blood pressure, pulse amplitude, pulse frequency, peripheral capillary oxygen saturation (SpO2), and/or the like.

Accordingly, control device 110 may automatically and/or objectively determine the status of tissue based on processing imaging data associated with a biological response in the tissue. In some implementations, control device 110 may automatically perform one or more actions associated with a determined status of the tissue according to the imaging data provided by monitoring device 120. For example, control device 110 may determine that the tissue of the patient is hypoxic based on a value of the estimated oxygen saturation, a value associated with an amount of cytochrome aa3, a value associated with lipid contents of the tissue, and/or the like. In such cases, control device 110 may alert, via a user interface, the operator that the patient may be developing HIE, in order to permit the operator to take appropriate action (e.g., perform a cesarean section, adjust a position of the fetus in the uterus and/or birth canal, and/or the like).

Accordingly, as described herein, monitoring device 120 enables monitoring of tissue of a patient through photoacoustic and/or thermoacoustic sensing and modulation. An EM component and an ultrasound sensing component of monitoring device 120 may provide a multi-spectral acoustic sensing device for noninvasive biological function estimation, and an ultrasound transmission component of monitoring device 120 may provide an ultrasound modulation element to interrogate a health of a tissue of a patient, including the health of muscle tissue, a particular organ tissue (e.g., brain tissue), and/or the like. Furthermore, control device 110 may analyze imaging data received from monitoring device 120 to detect a particular status of the tissue. Accordingly, in some implementations, monitoring device 120 and/or control device 110 may enable rapid identification of any development of cerebral hypoxia in a patient (e.g., a fetus during labor and/or a child after labor), so that appropriate care can be administered to the patient before potential arterial hypotension and/or metabolic acidosis become sufficiently severe to cause permanent damage.

As indicated above, FIG. 1 is provided merely as an example. Other examples may differ from what is described with regard to FIG. 1.

Figure 2:
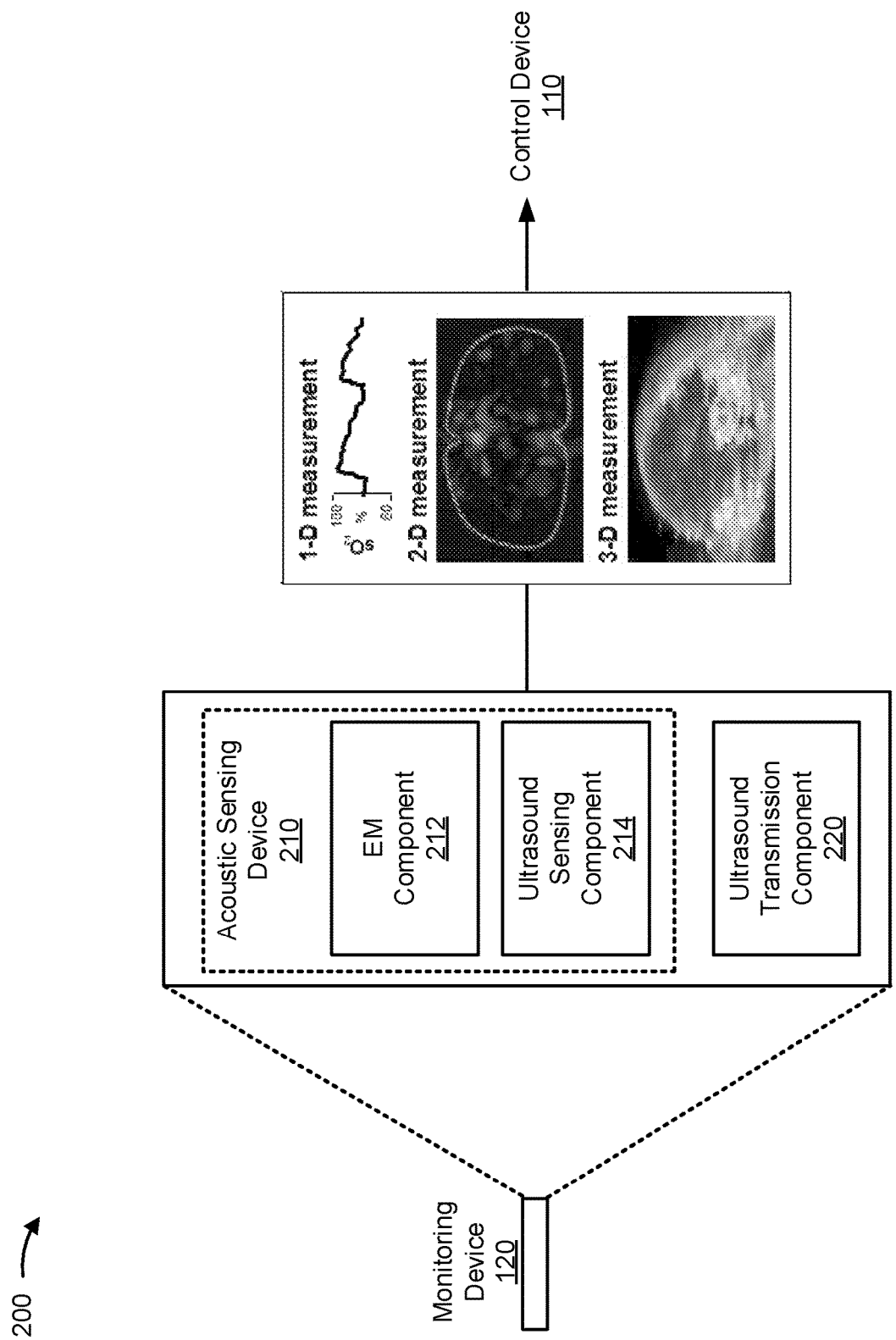
FIG. 2 is a diagram of an example implementation described herein.

FIG. 2 is a diagram of an example implementation 200 described herein. FIG. 2 depicts a monitoring device 120 capable of providing imaging data to a control device (e.g., control device 110). Monitoring device 120 of example implementation 200 may correspond to monitoring device 120 of FIG. 1. Monitoring device 120 of FIG. 2 includes an acoustic sensing device 210, which includes an EM component 212, an ultrasound sensing component 214, and an ultrasound transmission component 220.

EM component 212 may include one or more components to emit EM energy. For example, EM component 212 may include an optical component with a light emitter to emit light toward tissue of a patient in order to cause the light to be absorbed by the tissue. EM component 212 may include one or more optics (e.g., one or more lenses, one or more optical fiber bundles, such as bifurcated optical fiber bundles, and/or the like) and a light source (e.g., an emitter element, such as a laser emitting diode). Similarly, EM component 212 may include a thermal component that includes a microwave generator and/or microwave emitter to generate and/or emit EM energy as thermal microwave energy (which may be referred to herein as microwaves) toward tissue of a patient in order to cause the EM energy to be absorbed by the tissue. In some implementations, EM component 212 may be tunable to emit pulsed EM energy (e.g., pulsed light, such as pulsed NIR light in the range of 680-2400 nanometers (nm)) with a nanosecond-scale pulse duration and a repetition rate over tens of hertz (Hz). Accordingly, control device 110 may tune EM component 212 of monitoring device 120 to make real-time measurements of target molecules that are to be photoacoustically or thermoacoustically sensed according to a desired spatial resolution, a desired temporal resolution, and/or the like to permit control device 110 to estimate oxyhemoglobin saturation, hemoglobin concentration, cytochrome aa3 oxidized state, lipid contents, and/or the like in the tissue.

Ultrasound sensing component 214 is configured to sense absorption of the energy emitted by EM component 212. As described herein, the energy (e.g., light waves, microwaves, and/or the like) may be absorbed over time during a biological response (e.g., a biological response incited by ultrasound transmission component 220). Accordingly, ultrasound sensing component 214 may be configured to sense the biological response based on the energy being absorbed in the tissue during the biological response. Furthermore, ultrasound sensing component 214 may generate imaging data associated with the biological response to permit a status of the tissue to be determined (e.g., from the imaging data).

Ultrasound sensing component 214 may include one or more piezoelectric elements. In some implementations, the number of elements may provide a corresponding dimensional measurement. For example, a zero-dimensional configuration (e.g., a single element) may provide a one-dimensional measurement (e.g., time sequence of a sensed acoustic signal, as shown in the 1-D measurement), a one-dimensional configuration (e.g., a linear array of elements) may provide a two-dimensional measurement (e.g., a cross-sectional acoustic image, as shown the 2-D measurement), and a two-dimensional configuration may produce a volumetric acoustic image (e.g., a three-dimensional image, as shown in the 3-D measurement). Accordingly, ultrasound sensing component 214 may be suitably configured as described herein to provide a measurement and/or image associated with a biological response in tissue to permit the health status of the tissue to be determined.

Ultrasound transmission component 220 of monitoring device 120 may be an ultrasound modulation component (e.g., an ultrasound neuromodulation component) that includes a piezoelectric element and/or a thermoelastic element that can provide sufficient acoustic power that satisfies a threshold to cause a biological response, such as a neuronal depolarization in the tissue (e.g., in the brain). In some implementations, ultrasound transmission component 220 may include one or more ultrasound emitting elements according to a desired flexibility with respect to delivering the energy. For example, a single ultrasound element may not have flexibility in that the single ultrasound element provides the acoustic energy in a fixed direction and/or from a fixed position (e.g., via an acoustic lens associated with the single ultrasound element). On the other hand, an array-based ultrasound element configuration (which includes a plurality of ultrasound elements) may enable ultrasound transmission component 220 to focus transmissions in a plurality of different directions and/or on a plurality of different positions of a three-dimensional space (e.g., within a specific brain lobe, within a cortical region of the brain, and/or the like). For example, the EM-evoked sensing and neuromodulation probe components may include a 2-D array of ultrasound sensing elements within a 3-D spatial domain to permit monitoring device 120 to monitor volumetric hemodynamics in a brain.

As described herein, ultrasound sensing component 214 of the 2-D array can be implemented in any suitable configuration with any suitable number of elements or types of elements (e.g., one or more crossed linear array configurations for cost-effectiveness, a uniformly distributed element configuration for optimal spatial resolution, a randomly distributed element configuration for better suppression of side lobe, and/or the like). Furthermore, a configuration of an optical component of EM component 212 may include an optical fiber bundle within the 2-D array (e.g., for relatively deep light penetration), an optical fiber bundle that is uniformly distributed at a transmission end of the probe adjacent ultrasound sensing component 214 and/or ultrasound transmission component 220 (e.g., to configure a relatively wide field of view), an optical fiber bundle randomly distributed at the probe end adjacent ultrasound sensing component 214 and/or ultrasound transmission component 220 (e.g., to allow for relative uniformity).

In some implementations, ultrasound transmission component 220 of monitoring device 120 may be configured to transmit sub-thermal ultrasound energy (e.g., to satisfy certain laws and/or regulations associated with transmitting ultrasound energy toward tissue of a patient). In some implementations, ultrasound transmission component 220 may be configured to increase an ATP demand in the tissue, change a cytochrome aa3 oxidation state of the tissue, and/or cause oxyhemoglobin saturation in the tissue. Therefore, ultrasound transmission component 220 of monitoring device 120 may enable noninvasive monitoring of dynamic biological responses (e.g., neural responses, oxygenation responses, bleeding, and/or the like) in tissue to perturbations in energy demand via modulation and allow for the portrayal of a transition to a pathological state (e.g. an increasing extent of hypoxia).

In some implementations, a configuration of acoustic sensing device 210 and ultrasound transmission component 220 of monitoring device 120 may be based on a desired imaging width, a desired imaging aspect ratio, a desired size, and/or the like. For example, monitoring of an intrapartum fetal brain may involve monitoring device 120 having a relatively compact probe size (a linear probe with a width of less than six millimeters (mm) to enable the monitoring device 120 to be received in a uterus during labor) and a particular monitoring width in field-of-view to monitor the fetal brain from an end of monitoring device 120. On the other hand, one or more monitoring devices 120 that are relatively larger can be spatially arranged around the head of a child after birth to enable multiple fields of view.

In this way, monitoring device 120 may include EM component 212, ultrasound sensing component 214, and ultrasound transmission component 220 to permit monitoring device 120 to incite a biological response associated with the tissue, provide information associated with the biological response to control device 110, and thus enable a particular action associated with the patient to be taken (e.g., by an operator associated with control device 110).

As indicated above, FIG. 2 is provided merely as an example. Other examples may differ from what is described with regard to FIG. 2.

Figure 3A:
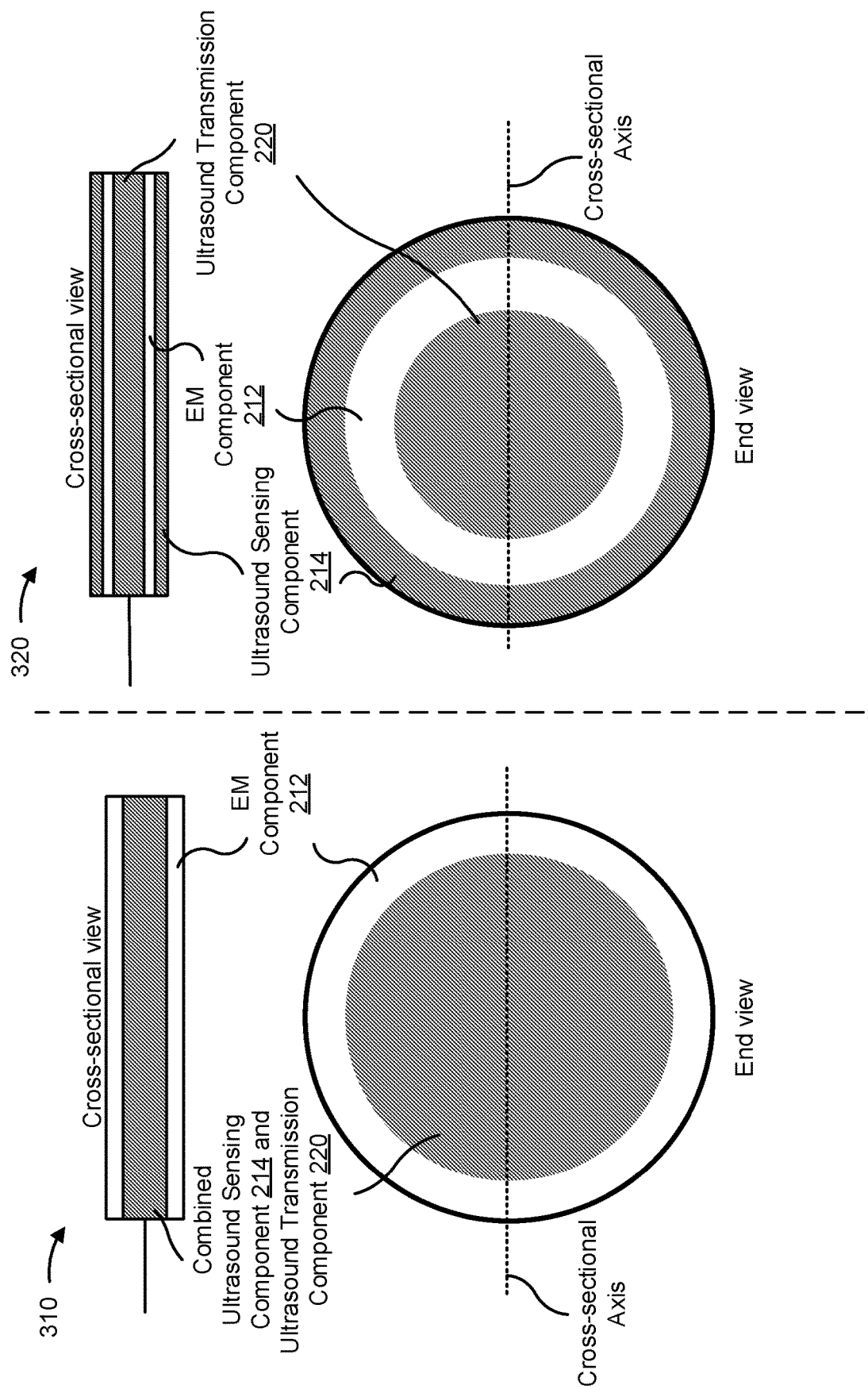
FIGS. 3A-3C are diagrams of example implementations of an electromagnetic-evoked acoustic device described herein.
Figure 3B:
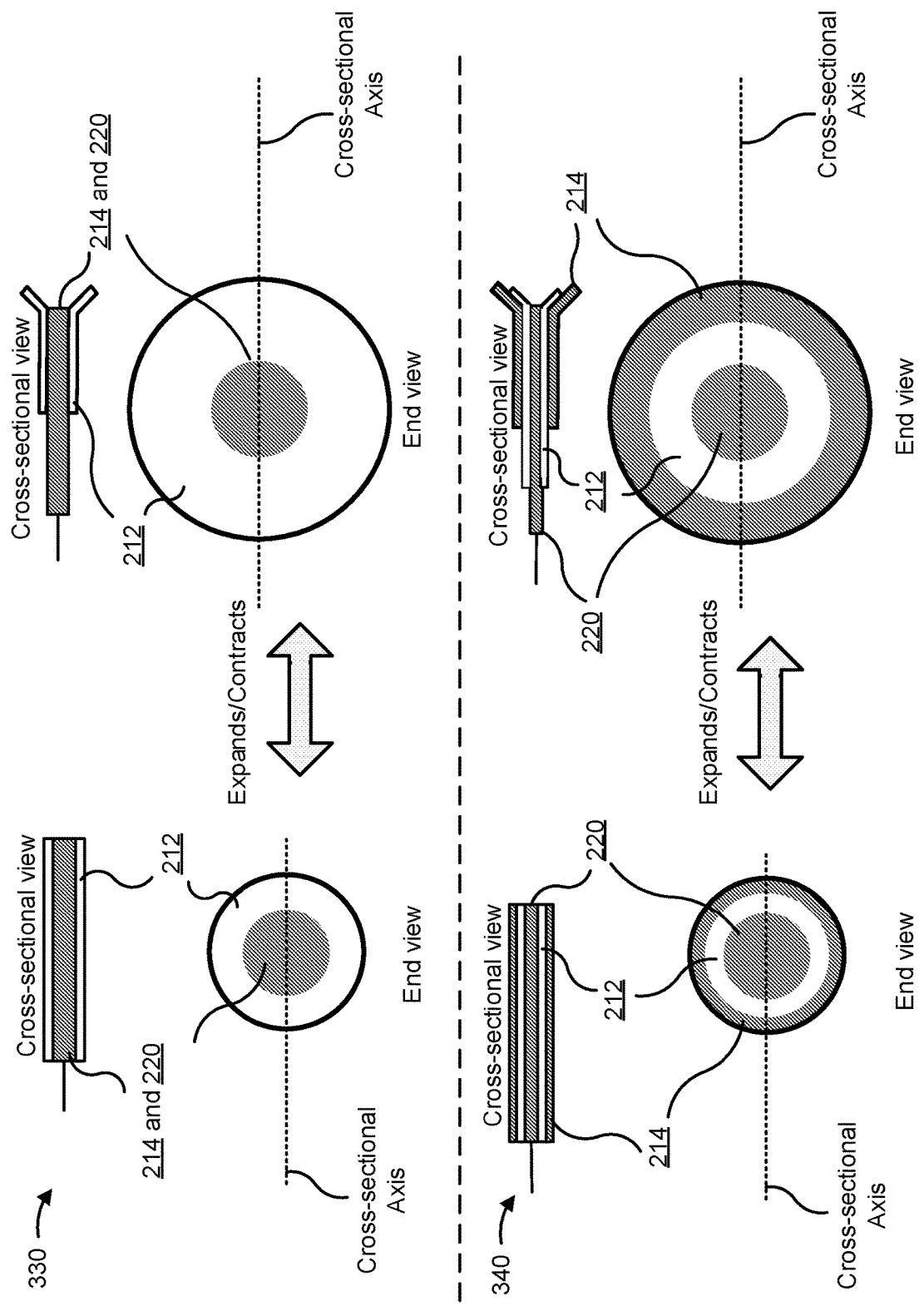
Figure 3C:
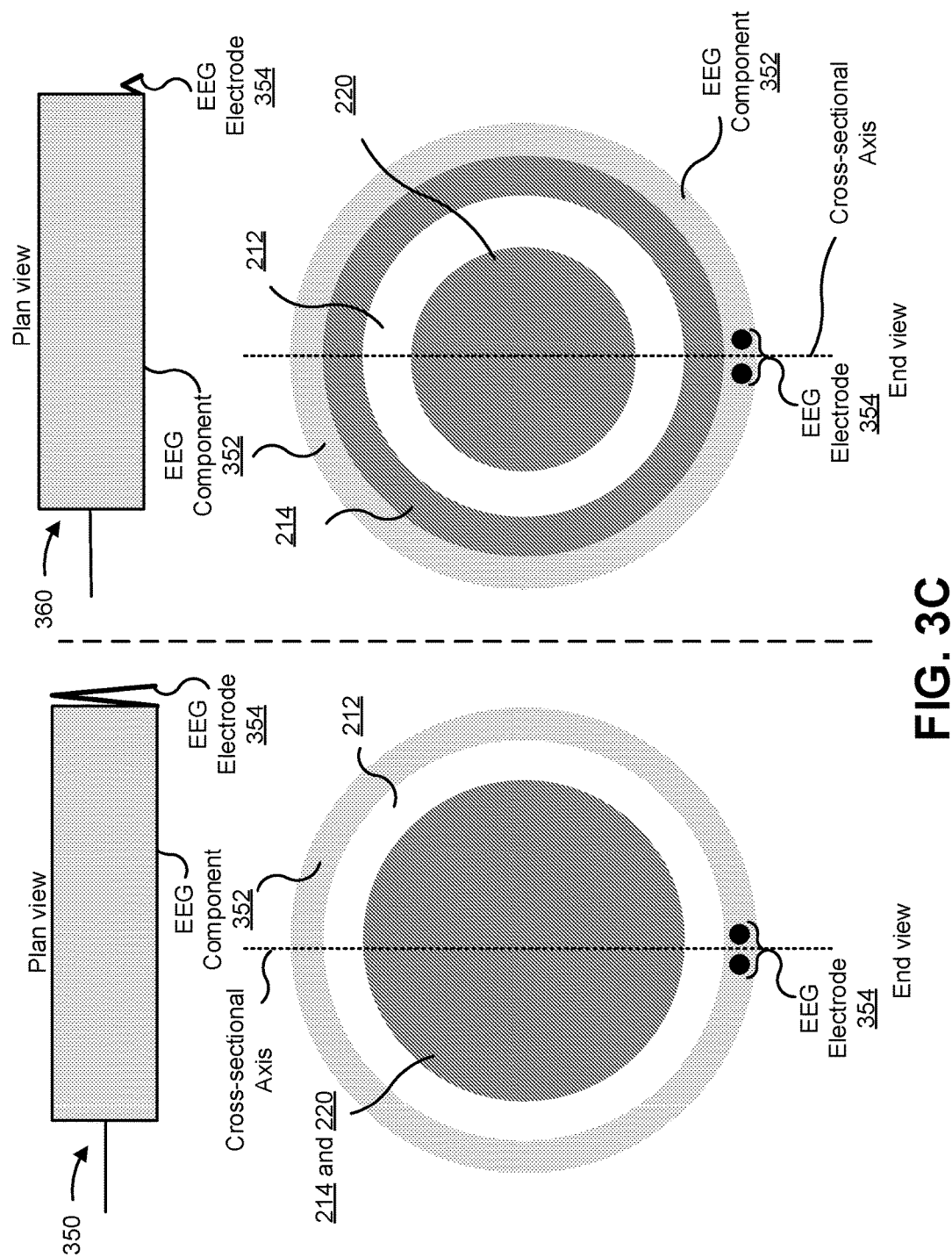

FIGS. 3A-3C are diagrams of example implementations of an EM-evoked device described herein. In FIGS. 3A-3C, an end view and a cross-sectional view (FIGS. 3A and 3B) or an end view and a plan view (FIG. 3C) of example implementations of a monitoring device, such as monitoring device 120 of FIGS. 1 and/or 2, are shown. In FIGS. 3A-3C, the example implementations are configurations of the monitoring device as a linear probe. In some implementations, one or more additional components may be included (e.g., a finger grip, an adhesive element that can be adhered to fetal scalp (e.g., via a gel), and/or the like). Additionally, or alternatively, the EM-evoked device of the example implementations of FIGS. 3A-3C may include a housing. The housing may be a transparent and/or translucent material that enables light to be emitted through the housing toward the tissue.

As shown in FIG. 3A, and by reference number 310, EM component 212 may be or may include a tubular EM element. For example, EM component 212 may include a tube of optics, such as an optical fiber bundle in the shape of a tube. Additionally, or alternatively, EM component 212 may include a tube shaped microwave emitter (or microwave emitting elements) that emits thermal EM energy in microwaves.

Furthermore, as shown by reference number 310, ultrasound sensing component 214 and ultrasound transmission component 220 may be a same element. For example, ultrasound sensing component 214 and ultrasound transmission component 220 may be implemented via a same piezoelectric element or a same thermoelastic element. Accordingly, as shown by reference number 310, an element to perform the operations of ultrasound sensing component 214 and ultrasound transmission component 220, as described herein, may be situated coaxially within tubular EM component 212. In some implementations, the configuration of EM component 212 and the combined ultrasound sensing component 214 and ultrasound transmission component 220 may be inverted. For example, an element to perform the operations of ultrasound sensing component 214 and ultrasound transmission component 220 may be a tubular element (e.g., a tubular piezoelectric element or a tubular thermoelastic element). In such a case, EM component 212 may be situated coaxially within the tubular element. Furthermore, the tubular element may be translucent in order to permit light from EM component 212 to be emitted through the tubular element.

Accordingly, by combining the functionality of ultrasound sensing component 214 and ultrasound transmission component 220 into a same element, the monitoring device associated with reference number 310 has a compact and efficient probe design (e.g., because two separate elements may not need to be configured to implement ultrasound sensing component 214 and ultrasound transmission component 220).

As further shown in FIG. 3A, and by reference number 320, EM component 212 may be a tubular optical element that is situated coaxially between ultrasound sensing component 214 and ultrasound transmission component 220. For example, as shown by reference number 320, ultrasound sensing component 214 and ultrasound transmission component 220 may be implemented via separate elements, where ultrasound sensing component 214 is a tubular element and ultrasound transmission component 220 is a cylindrical element. Accordingly, ultrasound transmission component 220 may be situated coaxially within EM component 212, and EM component 212 may be situated coaxially within ultrasound sensing component 214. In such cases, ultrasound transmission component 220, being centered within the probe, may enable centered interrogation of a biological function (e.g., to incite the biological response), while ultrasound sensing component 214 may be evenly distributed for uniform photoacoustic generation in a relatively wide field-of-view.

In some implementations, one or more ratios in the areas of EM component 212, ultrasound sensing component 214, and ultrasound transmission component 220 (as viewed from the end view) may be configurable according to desired efficiencies between photoacoustic or thermoacoustic monitoring and ultrasound modulation. For example, for a given area for EM component 212 and ultrasound sensing component 214, the ratio between EM component 212 and ultrasound sensing component 214 may correspond to a spatial resolution, sensing sensitivity, and/or sensing uniformity in a given field-of-view. Further, the given area for ultrasound transmission component 220 may correspond to a transmittance and spatial resolution of modulation with a transmitting efficiency based on a type of material of ultrasound transmission component 220 (e.g., a type of piezoelectric material and/or thermoelastic material).

In some implementations, ultrasound sensing component 214 may be a cylindrical element and ultrasound transmission component 220 may be a tubular element. In such cases, ultrasound sensing component 214 may be situated coaxially within EM component 212, and EM component 212 may be situated coaxially within ultrasound transmission component 220.

In this way, monitoring device 120 can be configured as a linear probe with an EM component 212, an ultrasound sensing component 214, and an ultrasound transmission component 220, as described herein. Such a linear probe may have a length that is substantially longer than the width (e.g., at least twice the width). Accordingly, EM component 212, ultrasound sensing component 214, and/or ultrasound transmission component 220 may be longitudinally situated within the probe.

In FIG. 3B, example implementations are shown to permit a monitoring device (e.g., the monitoring device 120 of FIGS. 1 and/or 2) to have an expandable or contractible field-of-view for photoacoustic or thermoacoustic sensing and/or imaging. As shown in FIG. 3B, and by reference number 330, a dimension (e.g., an external radius) of EM component 212 may expand and/or contract relative to a combined ultrasound sensing component 214 and ultrasound transmission component 220. For example, the monitoring device may be inserted into the uterus in a compact configuration, and, after the monitoring device is inserted within the uterus, the end (e.g., a transmission end corresponding to the end from which the light may be emitted and/or an ultrasound signal may be emitted) of the monitoring device may expand to widen the field-of-view of the monitoring device. The field-of-view may be widened so that the light may be emitted across a wider area. Accordingly, despite the probe having a compact diameter to permit insertion in the uterus during labor, a wide field-of-view can be achieved by configuring EM component 212 to expand or contract. As further shown in FIG. 3B, and by reference number 340, a tubular EM component 212 and a tubular ultrasound sensing component 214 can similarly be configured to expand and/or contract.

Accordingly, as shown in FIGS. 3A and 3B, EM component 212, ultrasound sensing component 214, and ultrasound transmission component 220 may be configured within a probe. In some implementations, EM component 212, ultrasound sensing component 214, and ultrasound transmission component 220 may be configured as one or more separate elements of monitoring device 120 (e.g., that are not integrated into a same housing). For example, EM component 212 may be an optical fiber bundle or microwave emitter that is a separate element from a piezoelectric element that is used to implement ultrasound sensing component 214 and ultrasound transmission component 220. Additionally, or alternatively, EM component 212 may be a component that is a separate element from both a first piezoelectric element that is used to implement ultrasound sensing component 214 and a second piezoelectric element, which is separate from the first piezoelectric element, that is used to implement ultrasound transmission component 220. However, in such cases, the separate components may be configured to correspondingly monitor (e.g., as controlled by control device 110) the tissue and provide information to control device 110, as described herein.

In FIG. 3C, example implementations are shown to permit a monitoring device (e.g., the monitoring device 120 of FIGS. 1 and/or 2) to include an EEG component 352 with an EEG electrode 354. As shown in FIG. 3C, and by reference number 350 and reference number 360, EEG component 352 may be configured as an external component (e.g., within a tubular housing of the probe) of the monitoring device, such that EM component 212, ultrasound sensing component 214, and/or ultrasound transmission component 220 are coaxially configured within EEG component 352. The EEG component includes an EEG electrode 354 that is configured to detect and/or sense electrical activity within the tissue. For example, the electrode may detect a voltage and/or current within the tissue via leads of EEG electrode 354. In some implementations, EEG component 352 may include a plurality of EEG electrodes 354.

In some implementations, EEG electrode 354 of EEG component 352 may be implemented via a spiral bipolar electrode. Accordingly, as shown by reference number 350, in the cross-sectional view, the spiral bipolar electrode may have a diameter that is the same or similar (e.g., within a tolerance) to an overall diameter of the probe. Additionally, or alternatively, as shown by reference number, in the cross-sectional view, the spiral bipolar electrode may have a diameter that is less than the overall diameter of the probe (e.g., a diameter corresponding to a thickness of EEG component 352). In some implementations, EEG component 352 may be a shaped such that EEG component 352 can be placed adjacent (e.g. parallel to) optic component 212 in the implementation associated with reference number 350 or adjacent to ultrasound sensing component 214 in the implementation associated with reference number 360.

As described herein, EEG component 352 is configured to sense and/or detect electrical activity associated with the tissue. For example, EEG component 352 may measure electrical activity associated with a neural response of the brain that was incited by acoustic energy from ultrasound transmission component 220. In such cases, EEG electrode 354 may detect timing associated with the neural response. For example, when there are one or more changes in the electrical activity (e.g., a change that corresponds to a particular pattern) of the brain, the EEG electrode 354 may capture measurements corresponding to a beginning of the neural response, an intermediate stage of the neural response, and/or an end of the neural response. In such cases, the timing may be determined relative to the transmission of the acoustic energy by ultrasound transmission component 220 to determine a status of the brain. For example, control device 110 may determine from the electrical activity and imaging data received from ultrasound sensing component 214 whether the response was representative of a normal response, indicating that the brain is not experiencing stress or injury, and/or an abnormal response, indicating that the brain is experiencing stress or injury.

Accordingly, as shown in FIG. 3C, EM component 212, ultrasound sensing component 214, ultrasound transmission component 220, and EEG component 352 may be configured within a probe. In some implementations, EM component 212, ultrasound sensing component 214, ultrasound transmission component 220, and/or EEG component 352 may be configured as one or more separate elements of monitoring device 120 (e.g., that are not integrated into a same housing). For example, EM component 212 may be an optical fiber bundle or microwave emitter that is a separate element from one or more piezoelectric elements that are used to implement ultrasound sensing component 214 and/or ultrasound transmission component 220 and an electrode element that may be used to implement EEG component 352.

As indicated above, FIGS. 3A-3C are provided merely as an example. Other examples may differ from what is described with regard to FIGS. 3A-3C. For example, although the example implementations of FIGS. 3A-3C are shown to be circular in shape, a monitoring device, as described herein, may be any other suitable shape, such as elliptical, rectangular, trapezoidal, triangular, and/or the like. Further, a device, such as a helmet-type device that is configured to fit over a head of a patient, a structured device with a frame shaped to fit a particular body part (e.g., an abdomen, a rib cage, a torso, a limb, and/or the like), and/or the like may be fit to include a plurality of one or more of the components of monitoring device 120 in examples FIGS. 3A-3C. In such cases, the plurality of components may be controlled synchronously (e.g., by control device 110) to monitor the patient as the patient is wearing the device or fit with the device (e.g., when the patient is a newborn or no longer in the womb).

Figure 4:
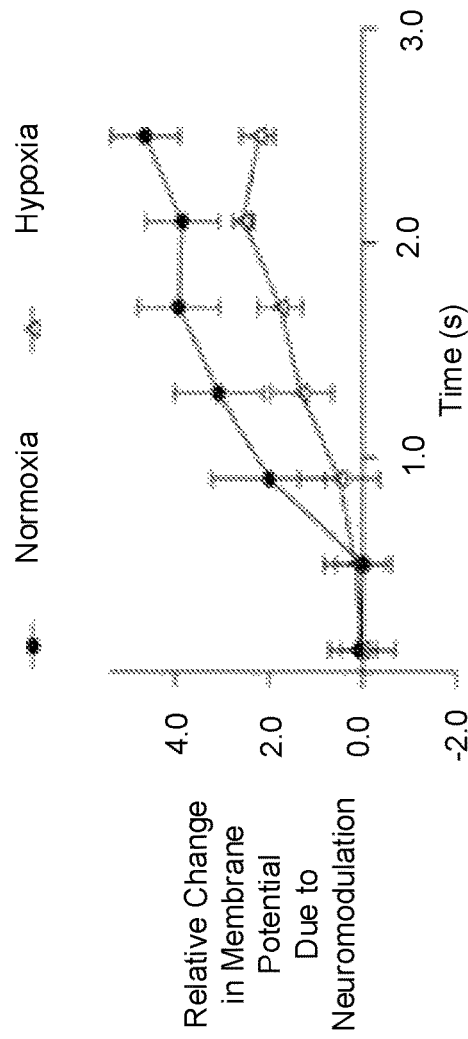
FIG. 4 is a diagram regarding an example implementation described herein.

FIG. 4 is a diagram regarding an example implementation 400 described herein. Example implementation 400 includes a graph of time versus a relative change in membrane potential due to neuromodulation, which can be used to indicate oxygen concentration in a tissue of a patient. Accordingly, the graph may represent a normoxic neural response (indicating a standard, healthy response) and a hypoxic neural response (indicating development of HIE) to acoustic energy transmitted by ultrasound transmission component 220, as described herein.

As shown in the graph of example implementation 400, an ultrasound-induced stimulation of a neural response can be used to differentiate between neurons in a normoxic condition or hypoxic condition. As shown in FIG. 4, just after 2.0 seconds in time, there is a decrease in the ultrasound-evoked membrane potential in hypoxic conditions. Therefore, as described herein, a neural response to ultrasound neuromodulation can enable assessment of oxygenation of the tissue, and thus enable assessment of whether the tissue may be developing pathological hypoxic conditions.

As indicated above, FIG. 4 is provided merely as an example. Other examples may differ from what is described with regard to FIG. 4.

Figure 5:
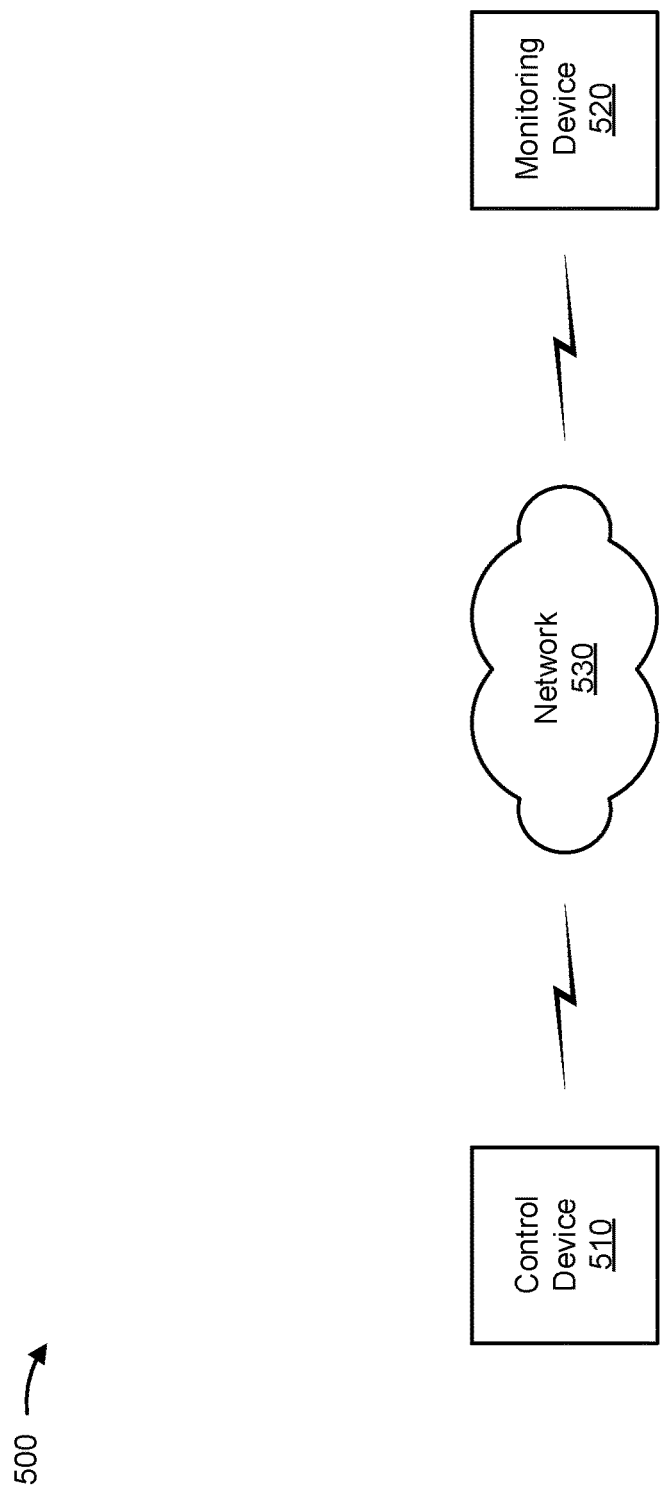
FIG. 5 is a diagram of an example environment in which systems and/or methods described herein may be implemented.

FIG. 5 is a diagram of an example environment 500 in which systems and/or methods described herein may be implemented. As shown in FIG. 5, environment 500 may include a control device 510, a monitoring device 520, and a network 530. Devices of environment 500 may interconnect via wired connections, wireless connections, or a combination of wired and wireless connections.

Control device 510 includes one or more devices capable of receiving, generating, storing, processing, and/or providing information associated with monitoring device 520 and/or providing imaging of tissue. For example, control device 510 may include a communication and/or computing device, such as a computer (e.g., a laptop computer, a tablet computer, a handheld computer, a desktop computer), a mobile phone (e.g., a smart phone), a wearable device (e.g., a smart wristwatch, a pair of smart eyeglasses, a heads-up display device, a virtual reality device, a visual augmentation device, etc.), or a similar type of device. In some implementations, control device 510 includes one or more devices to control monitoring device 520, such as a control console, a telemanipulator, an end-effector, a remote surgery console, and/or the like. In some implementations, control device 510 may include a user interface (e.g., a display device) for providing a visualization of imaging data, an image processing device for processing the imaging data to generate the visualization, and/or the like. In some implementations, control device 510 corresponds to control device 110 shown in FIG. 1.

Monitoring device 520 includes one or more devices capable of receiving, generating, storing, processing, and/or providing information associated with imaging and/or monitoring a patient. For example, monitoring device 520 may include an ME component, an ultrasound sensing component, an ultrasound transmission component, and/or the like. Although some implementations described herein are described in terms of an integrated monitoring device to monitor a patient, some implementations described herein may be used to obtain imaging data from a dedicated imaging device based on one or more operations to enable capturing of the imaging data. In some implementations, monitoring device 520 corresponds to monitoring device 120 shown in FIG. 1.

Network 530 includes one or more wired and/or wireless networks. For example, network 530 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
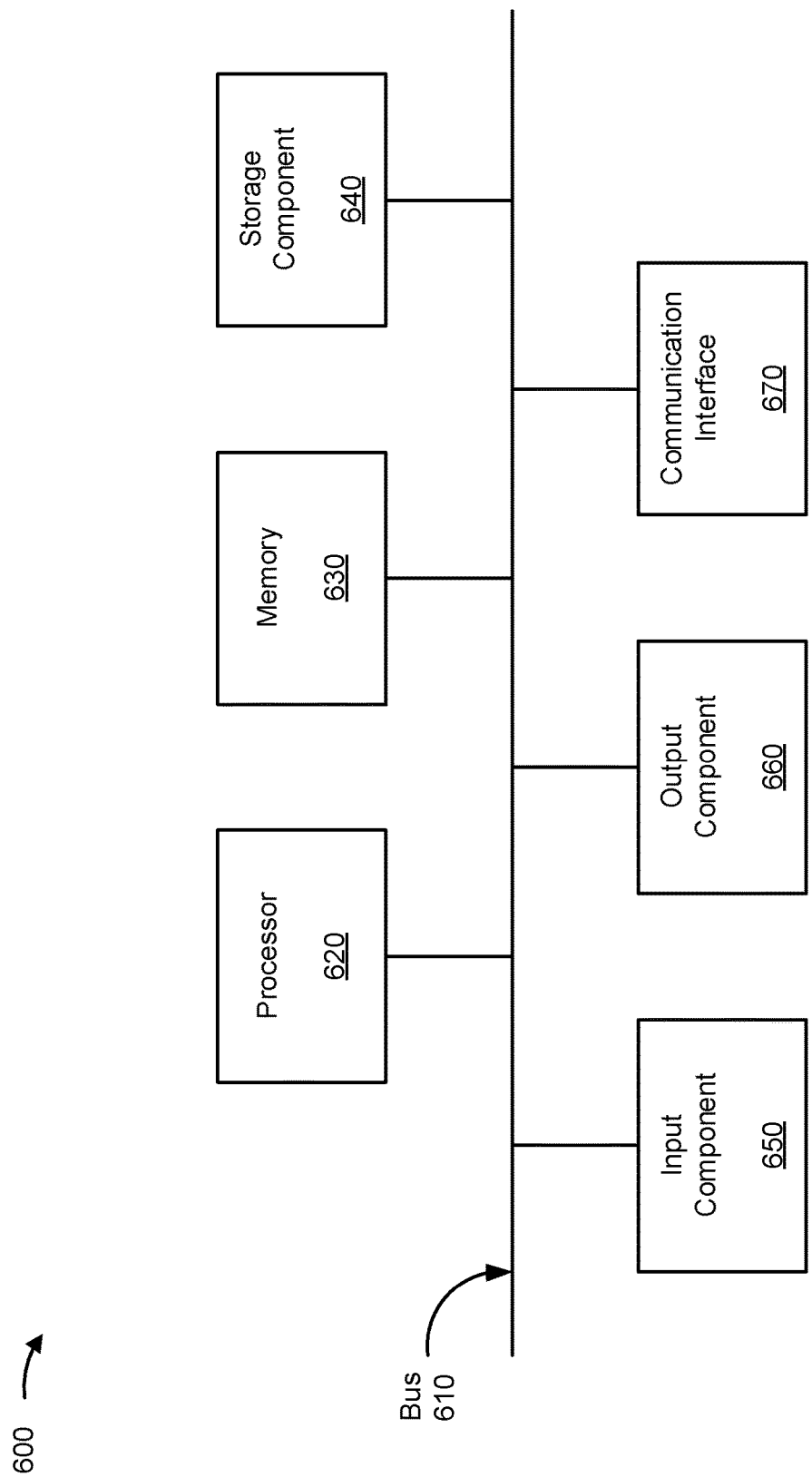
FIG. 6 is a diagram of example components of one or more devices of FIG. 5.

FIG. 6 is a diagram of example components of a device 600. Device 600 may correspond to control device 510 and/or monitoring device 520. In some implementations, control device 510 and/or monitoring device 520 may include one or more devices 600 and/or one or more components of device 600. As shown in FIG. 6, device 600 may include a bus 610, a processor 620, a memory 630, a storage component 640, an input component 650, an output component 660, and/or a communication interface 670.

Bus 610 includes a component that permits communication among multiple components of device 600. Processor 620 is implemented in hardware, firmware, and/or a combination of hardware and software. Processor 620 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 620 includes one or more processors capable of being programmed to perform a function. Memory 630 includes a random access memory (RAM), a read only memory (ROM), and/or another type of dynamic or static storage device (e.g., a flash memory, a magnetic memory, and/or an optical memory) that stores information and/or instructions for use by processor 620.

Storage component 640 stores information and/or software related to the operation and use of device 600. For example, storage component 640 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 650 includes a component that permits device 600 to receive information, such as via user input (e.g., a touch screen display, a keyboard, a keypad, a mouse, a button, a switch, and/or a microphone). Additionally, or alternatively, input component 650 may include a sensor for sensing information (e.g., a global positioning system (GPS) component, an accelerometer, a gyroscope, and/or an actuator). Output component 660 includes a component that provides output information from device 600 (e.g., a display, a speaker, and/or one or more light-emitting diodes (LEDs)).

Communication interface 670 includes a transceiver-like component (e.g., a transceiver and/or a separate receiver and transmitter) that enables device 600 to communicate with other devices, such as via a wired connection, a wireless connection, or a combination of wired and wireless connections. Communication interface 670 may permit device 600 to receive information from another device and/or provide information to another device. For example, communication interface 670 may include an Ethernet interface, an optical interface, a coaxial interface, an infrared interface, a radio frequency (RF) interface, a universal serial bus (USB) interface, a Wi-Fi interface, a cellular network interface, or the like.

Device 600 may perform one or more processes described herein. Device 600 may perform these processes based on processor 620 executing software instructions stored by a computer-readable medium, such as memory 630 and/or storage component 640. A computer-readable medium is defined herein as a non-transitory memory device. A memory device includes memory space within a single physical storage device or memory space spread across multiple physical storage devices.

Software instructions may be read into memory 630 and/or storage component 640 from another computer-readable medium or from another device via communication interface 670. When executed, software instructions stored in memory 630 and/or storage component 640 may cause processor 620 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 6 are provided as an example. In practice, device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

FIG. 7 is a flow chart of an example process 700 associated with biological function monitoring. In some implementations, one or more process blocks of FIG. 7 may be performed by a control device (e.g., control device 510). In some implementations, one or more process blocks of FIG. 7 may be performed by another device or a group of devices separate from or including the monitoring device, such as a monitoring device (e.g., monitoring device 520) and/or the like.

As shown in FIG. 7, process 700 may include causing an EM component of a monitoring device to emit energy toward tissue of a patient to cause the energy to be absorbed by the tissue (block 710). For example, the control device (e.g., using processor 620, memory 630, storage component 640, output component 660, communication interface 670, and/or the like) may cause an EM component of a monitoring device to emit energy toward tissue of a patient to cause the energy to be absorbed by the tissue, as described above.

As further shown in FIG. 7, process 700 may include causing an ultrasound transmission component to transmit acoustic energy toward the tissue to cause a biological response from the tissue (block 720). For example, the control device (e.g., using processor 620, memory 630, storage component 640, output component 660, communication interface 670, and/or the like) may cause an ultrasound transmission component to transmit acoustic energy toward the tissue to cause a biological response from the tissue, as described above.

As further shown in FIG. 7, process 700 may include obtaining, from an ultrasound sensing component, imaging data associated with the biological response, wherein the imaging data is generated from the energy being absorbed by the tissue (block 730). For example, the control device (e.g., using processor 620, memory 630, storage component 640, input component 650, communication interface 670, and/or the like) may obtain, from an ultrasound sensing component, imaging data associated with the biological response, as described above. In some implementations, the imaging data is generated from the energy being absorbed by the tissue.

As further shown in FIG. 7, process 700 may include performing an action associated with the imaging data (block 740). For example, the control device (e.g., using processor 620, memory 630, storage component 640, output component 660, communication interface 670, and/or the like) may perform an action associated with the imaging data, as described above.

Process 700 may include additional implementations, such as any single implementation or any combination of implementations described below and/or in connection with one or more other processes described elsewhere herein.

In some implementations, the control device, when causing the EM component to emit light pulses, may cause the EM component to emit light pulses with a threshold frequency to enable detection of the biological response in an image generated from the imaging data. In some implementations, the control device, when causing the ultrasound transmission component to transmit acoustic energy, may cause the ultrasound transmission component to transmit the acoustic energy at a neuromodulation frequency. In some implementations, the control device may cause the ultrasound sensing component to generate the imaging data associated with the biological response.

In some implementations, the imaging data corresponds to data for an image stream, and the control device may cause the ultrasound sensing component to generate the imaging data to have a threshold spatial resolution of the image stream and/or to have a threshold frame rate of the image stream. In some implementations, the control device may measure a parameter associated with the biological response based on the imaging data and determine a status of the tissue based on the parameter. In some implementations, the action is performed based on the status of the tissue.

In some implementations, the control device, when performing the action, may indicate the status of the tissue via a user interface communicatively coupled with the device. In some implementations, the control device, when performing the action, may cause an image generated from the imaging data to be displayed via a user interface communicatively coupled with the device. In some implementations, the optical or microwave component, the ultrasound transmission component, and the ultrasound sensing component are components of a photoacoustic device.

In some implementations, the control device may obtain, from an electroencephalography (EEG) component, electrical activity data associated with the biological response, and determine timing associated with the biological response based on the electrical activity data. In some implementations, the electrical activity data is obtained from the EEG component based on the timing associated with the biological response.

In some implementations, the control device may measure a parameter associated with the biological response based on the imaging data and the electrical activity data, and determine a status of the tissue based on the parameter. In some implementations, the action is performed based on the status of the tissue. In some implementations, the control device may use a machine learning model to identify a value associated with the parameter. In some implementations, the machine learning model is trained based on historical data associated with measuring the parameter from other imaging data and/or other electrical activity data associated with one or more other corresponding biological responses incited in one or more other corresponding tissues of one or more other patients.

Although FIG. 7 shows example blocks of process 700, in some implementations process 700 may include additional blocks, fewer blocks, different blocks, or differently arranged blocks than those depicted in FIG. 7. Additionally, or alternatively, two or more of the blocks of process 700 may be performed in parallel.

FIG. 8 is a flow chart of an example process 800 associated with photoacoustic or thermoacoustic monitoring. In some implementations, one or more process blocks of FIG. 8 may be performed by a control device (e.g., control device 510). In some implementations, one or more process blocks of FIG. 8 may be performed by another device or a group of devices separate from or including the monitoring device, such as a monitoring device (e.g., monitoring device 520) and/or the like.

As shown in FIG. 8, process 800 may include receiving, from an EM-evoked device, imaging data associated with a biological response in tissue of a patient, wherein the biological response is incited by an ultrasound transmission component of the photoacoustic device (block 810). For example, the control device (e.g., using processor 620, memory 630, storage component 640, input component 650, communication interface 670, and/or the like) may receive, from a photoacoustic device, imaging data associated with a biological response in tissue of a patient, as described above. In some implementations, the biological response is incited by an ultrasound transmission component of the photoacoustic device.

As further shown in FIG. 8, process 800 may include processing the imaging data to provide an image stream of the biological response (block 820). For example, the control device (e.g., using processor 620, memory 630, storage component 640, input component 650, output component 660, communication interface 670, and/or the like) may process the imaging data to provide an image stream of the biological response, as described above.

As further shown in FIG. 8, process 800 may include measuring a parameter associated with the tissue based on pixels of images of the image stream, wherein the parameter is measured based on values of the pixels changing, wherein the values of the pixels changing represents a change in saturation of hemoglobin in the tissue over a time period associated with the biological response (block 830). For example, the control device (e.g., using processor 620, memory 630, storage component 640, input component 650, output component 660, communication interface 670, and/or the like) may measure a parameter associated with the tissue based on pixels of images of the image stream, as described above. In some implementations, the parameter is measured based on values of the pixels changing. In some implementations, the values of the pixels changing represents a change in saturation of hemoglobin in the tissue over a time period associated with the biological response.

As further shown in FIG. 8, process 800 may include determining a status of the tissue based on the parameter (block 840). For example, the control device (e.g., using processor 620, memory 630, storage component 640, input component 650, output component 660, communication interface 670, and/or the like) may determine a status of the tissue based on the parameter, as described above.

As further shown in FIG. 8, process 800 may include performing an action based on determining the status (block 850). For example, the control device (e.g., using processor 620, memory 630, storage component 640, input component 650, output component 660, communication interface 670, and/or the like) may perform an action based on determining the status, as described above.

Process 800 may include additional implementations, such as any single implementation or any combination of implementations described below and/or in connection with one or more other processes described elsewhere herein.

In some implementations, the values of the pixels changing further represents at least one of a change in cytochrome aa3 oxidized state in the tissue over a time period associated with the biological response, or a change in lipid content of the tissue over a time period associated with the biological response.

In some implementations, the control device, when measuring the parameter, may use a machine learning model to identify a value associated with the parameter, wherein the machine learning model is trained based on historical data associated with measuring the parameter from other imaging data associated with one or more other corresponding biological responses incited in one or more other corresponding tissues of one or more other patients.

In some implementations, the control device, when determining the status of the tissue, may determine that a value associated with the parameter satisfies a threshold, and determine that the status is hypoxic based on the value associated with the parameter satisfying the threshold. In some implementations, the action is performed based on determining that the status is hypoxic. In some implementations, the control device, when performing the action, may issue, via a user interface, an alert associated with the patient based on determining that the status is hypoxic.

In some implementations, the control device, when performing the action, may indicate the status of the tissue via a user interface communicatively coupled with the device. In some implementations, a value of the parameter indicates a probability that the patient is experiencing a stroke. In some implementations, the tissue may be brain tissue. In some implementations, the patient is a fetus. In some implementations, the fetus is at least partially in a uterus of another patient.

In some implementations, a device with the proposed configurations can be used for other clinical applications with endoscopic or endorectal configurations. Such a configuration may support monitoring brain stem hypoxia; detecting brain death in critically ill patients; and evaluating patients for intra-abdominal bleeding.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like, depending on the context.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, and/or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," and the like are intended to be open-ended terms. Further, the phrase "based on" is intended to mean "based, at least in part, on" unless explicitly stated otherwise.

What is claimed is:

1. A system for biological function monitoring comprising:
   an electromagnetic-evoked acoustic device comprising:
      an electromagnetic component,
      an ultrasound transmission component,
      an ultrasound sensing component, and
      an electroencephalography component to detect electrical activity associated with a biological response from tissue of a patient; and
   a control device, wherein the control device includes one or more processors to:
      control the electromagnetic component to emit electromagnetic energy toward the tissue;
      control the ultrasound transmission component to transmit acoustic energy toward the tissue to incite the biological response;
      receive, from the ultrasound sensing component, imaging data associated with the biological response,
         wherein the imaging data is representative of the electromagnetic energy being absorbed by the tissue during the biological response;
      determine timing associated with the biological response based on the electrical activity;
      cause the ultrasound sensing component to provide the imaging data based on the timing; and
      perform an action associated with the biological response,
         wherein the action includes providing information associated with the imaging data.

2. The system of claim 1,
   wherein at least one of:
      the electromagnetic component comprises an optical component and the electromagnetic energy comprises light, or
      the electromagnetic component comprises a microwave emitter and the electromagnetic energy comprises thermal microwave energy.

3. The system of claim 1,
   wherein the one or more processors, when performing the action, are to:
      generate an image of the biological response based on the imaging data; and
      cause the image to be displayed via a user interface that is communicatively coupled with the control device.

4. The system of claim 1,
   wherein the one or more processors are further to:
      identify the biological response based on the imaging data;
      measure a parameter associated with the tissue based on the biological response; and
      determine that the parameter satisfies a threshold,
         wherein the one or more processors, when performing the action, are to:
            cause a user interface to issue an alert based on the parameter satisfying the threshold.

5. A method comprising:
   causing, by a control device, an electromagnetic component of a monitoring device to emit electromagnetic energy toward tissue of a patient to cause the electromagnetic energy to be absorbed by the tissue;
   causing, by the control device, an ultrasound transmission component of the monitoring device to transmit acoustic energy toward the tissue to cause a biological response from the tissue; and obtaining, by the control device and from an ultrasound sensing component of the monitoring device, imaging data associated with the biological response,
wherein the imaging data is generated from the electromagnetic energy being absorbed by the tissue, and
wherein the control device includes one or more processors to:
detect, based on an electroencephalography component, electrical activity associated with the biological response from the tissue;
determine timing associated with the biological response from the tissue based on the electrical activity;
cause the ultrasound sensing component to provide the imaging data based on the timing; and performing, by the control device, an action associated with the imaging data,
wherein the action includes providing information associated with the imaging data.

6. The method of claim 5,
wherein at least one of:
the electromagnetic component comprises an optical component and the electromagnetic energy comprises light, or
the electromagnetic component comprises a microwave emitter and the electromagnetic energy comprises thermal microwave energy.

7. The method of claim 5,
wherein causing the electromagnetic component to emit the electromagnetic energy comprises:
causing the electromagnetic component to emit light or thermal microwave energy with a threshold frequency to enable detection of the biological response in an image generated from the imaging data.

8. The method of claim 5,
wherein causing the ultrasound transmission component to transmit the acoustic energy comprises:
causing the ultrasound transmission component to transmit the acoustic energy at a neuromodulation frequency to cause a neural response.

9. The method of claim 5, further comprising:
causing the ultrasound sensing component to generate the imaging data associated with the biological response.

10. An electromagnetic-evoked acoustic device for non-invasive biological function monitoring, comprising:
an electromagnetic component to emit electromagnetic energy toward tissue of a patient to cause the electromagnetic energy to be absorbed by the tissue;
an ultrasound transmission component to transmit acoustic energy toward the tissue to cause a biological response from the tissue;
an electroencephalography component to detect electrical activity associated with the biological response; and
an ultrasound sensing component to sense the biological response from the tissue to permit a status of the tissue to be determined,
wherein the biological response is sensed based on the electromagnetic energy absorbed by the tissue during the biological response,
wherein timing associated with the biological response is determined based on the electrical activity, and
wherein the ultrasound sensing component provides imaging data based on the timing,
wherein the imaging data is representative of the electromagnetic energy being absorbed by the tissue during the biological response.

11. The electromagnetic-evoked acoustic device of claim 10,
wherein the electromagnetic energy includes light, and wherein the electromagnetic-evoked acoustic device further comprises:
a housing,
wherein the housing comprises a transparent material or a translucent material that enables light pulses to be emitted through the housing toward the tissue.

12. The electromagnetic-evoked acoustic device of claim 10,
wherein the electromagnetic component comprises an optical component that includes:
an optical fiber bundle, and
a light source,
wherein the light source is to emit the electromagnetic energy as light pulses via the optical fiber bundle.

13. The electromagnetic-evoked acoustic device of claim 10,
wherein the electromagnetic component comprises a thermal component that includes:
a microwave generator, and
a microwave emitter to emit the electromagnetic energy as thermal microwave energy.

14. The electromagnetic-evoked acoustic device of claim 10,
wherein the ultrasound sensing component and the ultrasound transmission component are a piezoelectric element.

15. The electromagnetic-evoked acoustic device of claim 14,
wherein the electromagnetic component includes a tubular electromagnetic element and the piezoelectric element is situated coaxially within the tubular electromagnetic element.

16. The electromagnetic-evoked acoustic device of claim 14,
wherein the piezoelectric element comprises a tubular piezoelectric element and the electromagnetic component is coaxially situated within the tubular piezoelectric element.

17. The electromagnetic-evoked acoustic of claim 10,
wherein the electromagnetic component includes a tubular electromagnetic element and the ultrasound sensing component comprises a tubular piezoelectric element, and
wherein the ultrasound transmission component is situated coaxially within the tubular electromagnetic element and the tubular electromagnetic element is situated coaxially within the tubular piezoelectric element.

18. The electromagnetic-evoked acoustic device of claim 10,
wherein the electromagnetic component includes a tubular electromagnetic element and the ultrasound transmission component comprises a tubular piezoelectric element, and
wherein the ultrasound sensing component is situated coaxially within the tubular electromagnetic element, and the tubular electromagnetic element is situated coaxially within the tubular piezoelectric element.

19. The electromagnetic-evoked acoustic device of claim 10, wherein the electromagnetic component, the ultrasound transmission component, and the ultrasound sensing component are configured in coaxial layers in a tubular configuration.

20. The electromagnetic-evoked acoustic device of claim 10, wherein the electroencephalography component is configured to record electrical activity.

* * * * *